(12) United States Patent
Glos et al.

(10) Patent No.: US 7,838,566 B2
(45) Date of Patent: Nov. 23, 2010

(54) PROCESS FOR THE PREPARATION OF POLYURETHANE COLD CURE FOAMS

(75) Inventors: Martin Glos, Essen (DE); Harald Modro, Gladbeck (DE); Mladen Vidakovic, Duisburg (DE)

(73) Assignee: Evonik Goldschmidt GmbH (DE)

( * ) Notice: Subject to any disclaimer, the term of this patent is extended or adjusted under 35 U.S.C. 154(b) by 277 days.

(21) Appl. No.: 11/550,220

(22) Filed: Oct. 17, 2006

(65) Prior Publication Data

US 2007/0093565 A1    Apr. 26, 2007

(30) Foreign Application Priority Data

Oct. 21, 2005   (DE) .................. 10 2005 050 473

(51) Int. Cl.
   *C08G 18/08* (2006.01)

(52) U.S. Cl. .................. 521/122; 521/110; 521/112

(58) Field of Classification Search .................. 521/122, 521/128, 129, 130, 131, 170, 174, 110, 112, 521/134, 137
See application file for complete search history.

(56) References Cited

U.S. PATENT DOCUMENTS

| | | | |
|---|---|---|---|
| 3,839,242 A | | 10/1974 | Huber |
| 3,839,384 A | | 10/1974 | Morehouse |
| 3,884,847 A | | 5/1975 | Pruvost |
| 4,042,540 A | | 8/1977 | Lammerting |
| 4,098,729 A | | 7/1978 | Kollmeier |
| 4,139,503 A | | 2/1979 | Kollmeier |
| 4,143,004 A | * | 3/1979 | Stromblad et al. .......... 521/174 |
| 4,211,849 A | | 7/1980 | Kollmeier |
| 4,276,385 A | * | 6/1981 | Tenhagen .................. 521/112 |
| 4,299,923 A | * | 11/1981 | Baskent et al. ............. 521/110 |
| 4,347,330 A | | 8/1982 | Demou |
| 4,350,777 A | * | 9/1982 | Henrichs et al. ............ 521/110 |
| 4,769,174 A | * | 9/1988 | Kilgour ..................... 516/13 |

FOREIGN PATENT DOCUMENTS

| | | |
|---|---|---|
| DE | 2221811 | 11/1973 |
| DE | 2337140 | 2/1974 |
| DE | 2246400 | 4/1974 |
| DE | 2356443 | 5/1974 |
| DE | 2533074 | 3/1976 |
| DE | 2603498 | 8/1976 |
| DE | 2728031 | 3/1978 |
| DE | 32 15 317 | 6/1983 |
| EP | 0092700 | 11/1983 |
| EP | 1080671 | * 3/2001 |
| EP | 1095968 | 5/2001 |
| GB | 1381571 | 1/1975 |
| WO | WO 02/069765 | * 9/2002 |

* cited by examiner

*Primary Examiner*—John Cooney
(74) *Attorney, Agent, or Firm*—Frommer Lawrence & Haug LLP

(57) ABSTRACT

The invention relates to a process for the preparation of polyurethane cold cure foams by reacting a mixture of highly reactive polyols, which usually have an average molecular weight of from about 4800 to 6500 g/mol and at least 70% of primary hydroxyl groups and optionally contain fillers, and polyfunctional isocyanates, amine activators, crosslinking agents, tin catalysts, blowing agents and stabilizers, wherein the stabilizers used are compounds of the general formula (1)

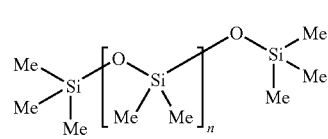

(1)

the proportion of siloxanes with N>9 being higher than 10% by weight and that with N>12 being equal to or higher than 5% by weight.

16 Claims, No Drawings

PROCESS FOR THE PREPARATION OF POLYURETHANE COLD CURE FOAMS

This application claims benefit under 35 U.S.C. 119(a) of German patent application DE 10 2005 050 473.6, filed on 21 Oct. 2005.

Any foregoing applications, including German patent application DE 10 2005 050 473.6, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The present invention relates to a process for the preparation of polyurethane cold cure foams, polydimethylsiloxanes being used as stabilizers.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

The industrial production of flexible polyurethane foams using isocyanates, polyetherpolyols, optionally crosslinking agents and other suitable additives has long been known and is described, for example, in Becker/Braun, Kunststoff-Handbuch [Plastics Handbook], Volume 7, Polyurethane [Polyurethanes], Carl Hanser Verlag, Munich, Vienna, 2nd Edition 1983.

Depending on the reactivity of the raw materials, a distinction is made between hot cured flexible foams ("hot cure foams" in the further text) and cold cured flexible foams ("cold cure foams" in the further text), the terms being derived from molded foam production. Thus, owing to the low reactivity of the raw materials, it is necessary in the preparation of hot cure foams according to the molding process to heat the foam in the mold at elevated temperature for complete crosslinking; these foams are therefore referred to as hot cure foams.

The development of highly reactive polyetherpolyols and, if appropriate, the additional use of crosslinking agents make it possible on the other hand to carry out the preparation of the foam in the mold owing to the rapid curing on supplying relatively little heat. Such foams are therefore referred to as cold cure foams.

In addition to foam molding, it is also possible to carry out the foaming by the block process, for which the terms cold and hot cure foam have likewise become established. Other commonly used terms for cold cure foam are: HR slabstock foam or HR molded foam and for hot cure foam are: conventional foam or hot cure molded foam, depending on the foaming technology.

Owing to the different raw material bases, cold cure foams have very typical physical properties which distinguish them from hot cure foams.

The cold cure foams have:
(a) a latex-like touch,
(b) a higher resilience than the conventional hot cure foams, which is why these foams are also referred to as "high-resilience foams" (HR foams),
(c) a compressive strength characteristic differing from hot foam (higher SAG factor) and therefore provide better comfort for sitting when used as upholstery material (furniture foam),
(d) good long-term performance with only little tendency to suffer fatigue, which is of considerable interest particularly in the automotive sector,
(e) better flame retardance than conventional hot cure foams, owing to their melt behavior,
(f) more advantageous energy balance and shorter molding times in foam molding.

A mixture of polyol, polyfunctional isocyanate, amine activator, tin or zinc catalyst, stabilizer, blowing agent (either water for the formation of $CO_2$ and, if necessary, addition of physical blowing agents), optionally with addition of flame retardants, color pastes, fillers, crosslinking agents or other customary processing auxiliaries, is reacted for the preparation of a flexible PU foam.

The difference between hot cure foam and cold cure foam preparation is that highly reactive polyols and optionally low molecular weight crosslinking agents are used for cold cure foams. It is also possible to get the function of the crosslinking agent from isocyanates having a relatively high functionality. Thus, reaction of the isocyanate groups with the hydroxyl groups occurs as early as the expansion phase ($CO_2$ formation from —NCO and $H_2O$) of the foam. This fast polyurethane reaction leads, via the viscosity increase, to a relatively high intrinsic stability of the foam during the blowing process compared to a hot cure foam.

Accordingly, cold cure foam requires stabilizers which help to control the cell size and cell size distribution and contribute to surface and subsurface stabilization, but have only slightly or no stabilizing properties compared to a hot cure foam which has less intrinsict stability and therefore needs stronger stabilization from the added stabilizer.

Basically, the typical cold cure foam stabilizers are polymers based on polysiloxanes which have been modified to a greater or lesser extent by suitable organic groups. In intrinsically stable systems, in particular unmodified siloxanes, the polydimethylsiloxanes, of the formula (1)

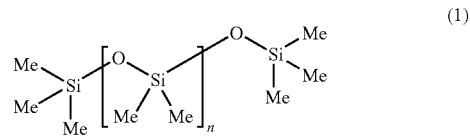

are used, the total number of Si atoms being $N=n+2$.

Polyols used are highly reactive polyols. Firstly there are trifunctional polyols which, in addition to a high molecular weight of usually from about 4800 to 6500 g/mol, have at least 70% (up to 95%) of primary hydroxyl groups so that the OH number thereof is from 36 to 26 mg KOH/g. These polyols are composed of up to 90% of propylene oxide, but contain virtually exclusively primary —OH groups resulting from the addition reaction with ethylene oxide. The primary OH groups are much more reactive toward the isocyanate groups than the secondary OH groups of the polyols used for the hot cure flexible foam. The OH numbers thereof are (at molecular weights of from 3000 to 4500 g/mol) usually from 56 to 42 mg KOH/g.

The highly reactive polyols are obtained by polyaddition of propylene oxide or ethylene oxide with relatively highly functional compounds, such as glycerol, pentaerythritol or trimethylolpropane.

A further class of highly reactive polyols comprises the so-called filler polyols (polymer polyols). In addition to the above mentioned characteristics, the filler polyols are distinguished in that they contain dispersed solid organic fillers up to a solids content of 40% by weight or more. Inter alia, the following are used:

A. SAN polyols:
  These are highly reactive polyols which contain a copolymer based on styrene/acrylonitrile (SAN) in dispersed form.
B. PHD polyols:
  These are highly reactive polyols which contain polyurea, likewise in dispersed form.
C. PIPA polyols:
  These are highly reactive polyols which contain a polyurethane (formed by in situ reaction of an isocyanate with an alkanolamine in a conventional polyol) in dispersed form.

The solid content of the polymer polyol, which is preferably from 5 to 40% by weight or more, depending on the application, is responsible for improved cell opening, so that the polyol can be foamed in a controlled manner, in particular with TDI, and no shrinkage of the foams occurs. The solid thus acts as an essential process aid. A further function consists in controlling the hardness via the solids content, because higher solids contents result in a greater hardness of the foam.

The formulations with solid-containing polyols have substantially less intrinsic stability and therefore also tend to require physical stabilization in addition to the chemical stabilization by the crosslinking reaction.

Depending on the solids content of the polymer polyols, they are used alone or as a mixture with the abovementioned "unfilled" polyols which do not contain any solids.

Isocyanates used are both TDI (2,4- and 2,6-toluylene diisocyanate isomer mixture) and MDI (4,4'-diphenylmethane diisocyanate). So-called "crude MDI" or "polymeric MDI" also contains the 2,4'- and 2,2'-isomers in addition to the 4,4'-isomer, as well as molecules having more than 2 phenyl rings. Two-ring MDI products predominantly comprising 2,4'- and 4,4'-isomer mixtures or prepolymers thereof are referred to as "pure MDI".

For slabstock and molded foams, different isocyanates are frequently used. Thus, as a rule pure TDI (various 2,4- and 2,6-isomer mixtures) in combination with solid-containing polyols are used as polyfunctional isocyanate in cold cure slabstock foam systems. Modified TDI types in combination with highly reactive unfilled polyols are also used. Publications DE-A-25 07 161 (U.S. Pat. No. 4,211,849) and DE-A-26 03 498 (U.S. Pat. No. 4,098,729) also describe the use of crystalline polyhydroxy compounds as crosslinking agents in block foaming, in combination with highly reactive unfilled polyols and TDI, trimerized TDI or TDI/MDI mixtures. Pure MDI formulations on the other hand are rarely used in the preparation of cold cure slabstock foams.

Preferably used amine activators are tertiary amines, such as, for example, triethylenediamine (TEDA) which is predominantly crosslinking, i.e. catalyzes the reaction between isocyanate and polyol, or bis(2-dimethylaminoethyl) ether (BDE) which is predominantly blowing, i.e. catalyzes the reaction between isocyanate and water. Many formulations are based on a combination catalysis of these two compounds. However, other customary amines are also possible; the amount used is usually from 0.05 to 0.5 part, based on 100.0 parts of polyol.

Low molecular weight polyfunctional compounds reactive toward isocyanates are referred to as crosslinking agents. Hydroxyl- or amine-terminated substances, such as, for example, glycerol, triethanolamine (TEOA), diethanolamine (DEOA) and trimethylolpropane are suitable. The concentration used is usually from 0.5 to 2.0 parts, based on 100.0 parts of polyol, depending on the formulation but may also differ therefrom. With the use of crude MDI in the foam molding, this likewise performs a crosslinking function. The content of low molecular weight crosslinking agents can therefore be correspondingly reduced with increasing amount of crude MDI.

The polyurethane reaction is generally catalyzed by the addition of tin activators. Either dibutyltin dilaurate (DBTDL), tin(II) octanoate, tin ricinoleate or suitable zinc compounds are used. The amounts used are usually from 0.01 to 0.5 part, based on 100.0 parts of polyol, but may also differ therefrom.

In the case of the blowing agents, a distinction is made between chemical and physical blowing agents. The chemical blowing agents include water, whose reaction with the isocyanate groups leads to the formation of $CO_2$. The density of the foam is controlled by the amount of water added, with preferably used amounts being from 1.5 to 5.0 parts, based on 100.0 parts of polyol. In addition physical blowing agents, (e.g. chlorofluorohydrocarbons, methylene chloride, acetone, 1,1,1,-trichloroethane, etc.) can also be used.

The preparation of cold cure foam additionally requires stabilizers which help to control the cell size and cell size distribution and contribute to surface and subsurface regulation but as a rule have only slightly stabilizing properties in comparison with hot cure foam stabilizers. The requirements with regard to the stabilizers differ depending on slabstock production or foam molding:

In slabstock production, apart from foam stabilization, the necessary cell opening at the right time is the actual problem. Once the polymerization reaction at the end of expansion has progressed to such an extent that the slab is already completely chemically stabilized, cell opening can as a rule no longer be carried out. The entire foam bun will therefore shrink. If cell opening is effected too early, this leads either to a collapse of the foam or, in the case of relatively intrinsically stable systems, to a foam which may suffer a shrinkage process some hours after its preparation. With the aid of a suitable stabilizer, it is possible to control both the time and the intensity of cell opening. In addition, the stabilizer should regulate the cell structure and in particular the surface and subsurface zone (particularly important in molded foam). The cold cure foam should have a slightly coarse cell and an irregular cell structure so that the particular physical properties thereof are achieved.

The requirements with regard to the stabilizer for the cold cure slabstock foam are therefore primarily controlled foam stabilization, cell opening at the right time, cell regulation and control of the cell size distribution.

In the production of a molded foam body, additional requirements arise. The expanding reaction mixture must overcome relatively long flow distances in order to fill the entire mold volume. The frictional resistance against the mold walls easily leads to destruction of entire groups of cells so that cavities form under the foam skin. This defect pattern also occurs when inserts introduced for reinforcement have to be surrounded with foam. A further critical zone is present in the region of the vents. If excess blowing gas flows past the groups of cells at too high a velocity, this leads to partially collapsed zones.

In addition, the nature of the foam skin is assessed critically.

General requirements with regard to a stabilizer are moreover high effectiveness, i.e. it should display its optimum activity even when used in low concentrations. Furthermore, its processing latitude should be large, i.e. the concentration range in which the stabilizer can be used should be as large as possible so that small changes in the foam formulation can be carried out without problems.

In summary, a cold cure molded foam stabilizer will therefore have to meet the following requirements:

Sufficient stabilization of the foam, stabilization to the influences of shear forces, stabilization of the surface and subsurface zone and of the skin, control of the cell size and of the cell size distribution and avoidance of increased closed-cell character.

Special organosiloxanes have already been used as additives for such cold cure foams in order to eliminate these defects, cf.DE-A-22 21 811 (GB 1,381,571), DE-A-23 37 140 (U.S. Pat. No. 3,884,847) and DE-A-22 46 400 (U.S. Pat. No. 3,839,242). However, these known organosiloxanes still have disadvantages, such as poor reproducibility, relatively high usage concentrations and a relationship of regulating action in the surface and subsurface zones of the foam and a tendency of the foams prepared with them to shrink which is insufficiently balanced in some cases.

The use of low-viscosity methylpolysiloxanes as additives for cold cure foams was already known. However, their disadvantages in terms of an unacceptable tendency to shrink are described in DE-A-23 56 443 (U.S. Pat. No. 3,839,384). The effect of such low-viscosity methylpolysiloxanes of leading to a finer foam structure, which is likewise stated in the this Laid-Open Application, is also a disadvantage since, as is already known from many practical experiments, a slightly irregular pore structure characteristic of cold foams is a good precondition for optimum properties of the foam for upholstery purposes.

DE-A-25 33 074 (U.S. Pat. No. 4,042,540) describes a process for the preparation of cold cure foams using, inter alia, polydimethylsiloxanes of the general formula (1),

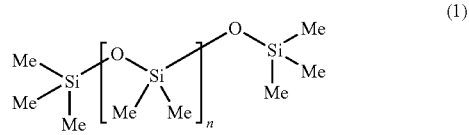

wherein the polysiloxanes used are those in which N=(n+2)=4 to 12 (wherein N is number of Si atoms), the total content of polydimethylsiloxanes with N from 13 to 22 being permitted to be not more than 0.5% by weight and species with N>22 to be completely separated off.

EP-A-1 095 968 (U.S. Pat. No. 6,239,186) confirms good foam stabilization capacity of a proposed solution based on DE-A-25 33 074, but criticizes the poor dimensional stability. For eliminating this disadvantage, it is proposed to increase the proportions of polydimethylsiloxanes with N from 7 to 9 to at least 90% of the siloxane mixture.

Common to both proposed solutions is that only polydimethylsiloxanes having chain lengths stipulated within the limited range may be used. Compounds having lower or higher n values may be present in the stabilizer mixture in amounts of <10% by weight, preferably <5% by weight. However, higher n values result in a significantly higher proportion of closed-cell foams, resulting in greater shrinkage. Low n values reduce the efficiency of cell opening and, owing to their volatility, play a considerable role in causing the undesired fogging effect.

The corresponding siloxanes, as in DE-A-25 33 074 and EP-A-1 095 968, having the desired narrow homolog distribution must therefore be prepared by complicated separation methods, in particular fractional distillations. Such energy-intensive processes, in particular for removing the higher-boiling constituents, are disadvantageous in terms of process economy at the present time of constantly increasing energy costs and are therefore no longer expedient.

There was therefore a need for stabilizers for polyurethane cold cure foams, which meet the requirements set in practice and can be obtained with less energy consumption.

Surprisingly, it has now been found that, on increasing the content of polydimethylsiloxanes having higher n values, i.e. substantially above the critical limits stated in the prior art, usable stabilizers are obtained again. This "suitability gap" was in no way foreseeable, owing to the clear reservations of the teachings of the prior art.

The invention therefore relates to a process for the preparation of polyurethane cold cure foams by reacting a mixture of highly reactive polyols, which usually have an average molecular weight of from about 4800 to 6500 g/mol and at least 70% of primary hydroxyl groups and optionally contain fillers, and polyfunctional isocyanates, amine activators, crosslinking agents, catalysts, blowing agents and stabilizers, wherein the stabilizers used are compounds of the general formula (1)

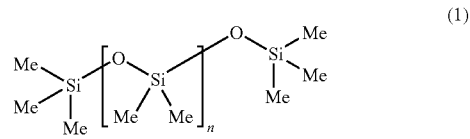

with N=(n+2), the proportion of siloxanes with N>9 being higher than 10% by weight and that with N>12 being higher than 5% by weight based on the total amount of siloxanes.

In another embodiment of siloxanes N>9, the proportion of siloxanes with N>9 is between 10% to 75% by weight based on the total amount of siloxanes. In yet another embodiment of the invention, the proportion of siloxanes with N>9 is between 15% to 70% by weight.

In another embodiment of siloxanes N>12, the proportion of siloxanes with N>12 is between 5% to 30% by weight based on the total amount of siloxanes. In yet another embodiment of the invention, the proportion of siloxanes with N>12 is between 7% to 25% by weight.

Polysiloxanes having 13 to 22 Si units (n=11 to 20; N=13 to 22) may be present in proportions of up to 65% by weight based. In another embodiment of siloxanes N=13 to 22, the proportion of siloxanes with N=13 to 22 is between 3% to 30% by weight based on the total amount of siloxanes. In yet another embodiment of the invention, the proportion of siloxanes with N=13 to 22 is between 5% to 25% by weight.

Fractions of N>22 may also be present in proportions of up to 5% by weight. In another embodiment of siloxanes N>22, the proportion of siloxanes with N>22 is between 0% to 5% by weight based on the total amount of siloxanes. In yet another embodiment of the invention, the proportion of siloxanes with N>22 is between 0% to 3% by weight.

The fractions of volatile linear (N<5) and cyclic siloxanes (D3 to D8—for illustrative purposes, the figures for D3, D4 and D5 are shown below)

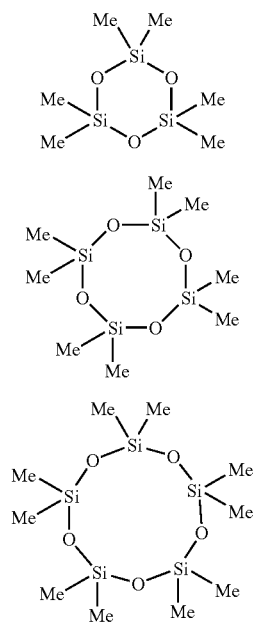

should be <5% by weight, preferably <2% by weight. In another embodiment of siloxanes N<5 and cyclic siloxanes (D3 to D8), the proportion of siloxanes with N<5 and cyclic siloxanes (D3 to D8) is between 0% to 5% by weight based on the total amount of siloxanes. In yet another embodiment of the invention, the proportion of siloxanes with N<5 and cyclic siloxanes (D3 to D8) is between 0% to 2% by weight. Better emission and fogging behavior of the foams is achieved by separating off the short-chain siloxanes.

In another embodiment of siloxanes N=11 to 14, the proportion of siloxanes with N=11 to 14 is between 55% and 75% by weight based on the total amount of siloxanes. In yet another embodiment of the invention, the proportion of siloxanes with N=11 to 14 is between 55% to 60% by weight.

In another embodiment of the foams of the invention, the degree of settling is between 0.1-0.5 cm (0.1-0.5 cm) and has a blow off behavior rating of 1 to 2. In yet another embodiment of the foams of the invention, the degree of settling is between 0.2-0.4 cm and has a blow off behavior rating of 1 to 2. Settling is the distance the foam drops after the rise phase during production as described, e.g., in U.S. Pat. No. 5,990,187 and EP 1029878 A1. The effect of settling is also described in: Flexible Urethane Foams, Editors: Ron Herrington and Kathy Hock, The Dow Chemical Company (Chapter 9, page 8 and Appendix A, page 21), $2^{nd}$ Edition (1997).

The siloxanes used according to the invention can be prepared, for example, by economically separating off the readily volatile linear (N<5) and cyclic siloxanes (D3 to D8) constituents.

The polysiloxanes used according to the invention can be used alone or in combination with other siloxanes, which may also be organically modified, stabilizers and/or cell openers.

The siloxanes used according to the invention are used in amounts of from 0.01 to 1.0 part per 100 parts of polyol and preferably in amounts of from 0.01 to 0.7 part per 100 parts of polyol.

Catalysts which may be used are the substances known according to the prior art, such as, in particular, amines and tin and zinc compounds.

As amine activators or catalysts, all substances known in the art can be used. Examples of amines include but are not limited to tertiary amines like triethylene diamine (TEDA) or Bis(2-dimethylaminoethyl) ether (BDE) and the amines described in EP 1095968 (U.S. Pat. No. 6,239,186) and EP 0499200 (U.S. Pat. No. 5,192,812).

Examples of tin based catalysts include but are not limited to dibutyl tin dilaurate and tin octoate. All metal based catalyst which are known to be suitable for this application can be used. Further examples of these substances are mentioned in EP 0499200.

It is possible to use both chemical and physical blowing agents, such as, for example, $CO_2$, pentane, chlorofluorohydrocarbons, water and methylene chloride. The foam densities are appropriately influenced thereby in the manner known to the person skilled in the art.

The stabilizers used according to the invention can be used both for cold cure slabstock foam and cold cure molded foam, for systems based on pure TDI, MDI and mixtures thereof in combination with the corresponding polyols.

The stabilizers used according to the invention have a relatively broad processing latitude. Good stabilization in combination with improved open-cell character of the foam is achieved. Owing to the multiplicity of possible raw materials very many formulation variants are in principle possible. For optimizing the respective formulation variants, some exploratory experiments may therefore be necessary.

The properties of the polymethylsiloxanes of the formula (1) according to the invention are demonstrated by the following examples. The amounts are stated in parts by weight. The polysiloxanes are used in different amounts.

The invention is further described by the following non-limiting examples which further illustrate the invention, and are not intended, nor should they be interpreted to, limit the scope of the invention.

EXAMPLES

In the following examples, the siloxanes according to the invention are tested in the formulations A, B and C.

Description of the Formulations:

Formulation A:
75 parts of polyol (Hyperlite 1629) having an OH number of 31 mg KOH/g, 25 parts of polymer polyol (Hyperlite 1650) having an OH number of 20 mg KOH/g and a solids content of 43%, 4 parts of water, 0.47 part of a mixture of TEGOAMIN 33 and TEGOAMIN BDE, 1.45 parts of crosslinking agent and 47 parts of toluylene diisocyanate containing 80% of 2,4-diisocyanatotoluene and 20% of 2,6-diisocyanatotoluene (T80).

Formulation B:
70 parts of polyol (Voralux HF 505) having an OH number of 29 mg KOH/g, 30 parts of polymer polyol (Voralux HL 400) having an OH number of 33 mg KOH/g and a solids content of 43%, 4.5 parts of water, 1.75 parts of crosslinking agent, 1.87 parts of a mixture of TEGOAMIN 33 and TEGOAMIN ZE 1, 1.2 parts of cell opener, 0.3 part of catalyst, based on tin, and 53 parts of the isocyanate toluylene diisocyanate containing 80% of 2,4-diisocyanatotoluene and 20% of 2,6-diisocyanatotoluene (T80).

Formulation C:

100 parts of polymer polyol (Voranol HN 360) having an OH number of 29 mg KOH/g and a solids content of 15%, 2.5 parts of water, 0.58 part of a mixture of TEGOAMIN 33 and TEGOAMINE BDE, 2 parts of cell opener, 0.11 part of catalyst based on tin, and 51 parts of isocyanate consisting of 72% of an MDI prepolymer having an NCO content of 28% and 28% of an MDI-based oligomer having a NCO content of 32%.

Examples in Molded Foam, Formulation A:

The foams were prepared in the known manner by mixing all components, except for the isocyanate, in a beaker and then adding the isocyanate and stirring it in for 7 seconds at high stirrer speed. Thereafter, the reaction mixture was introduced into a heated mold (65° C.) and allowed to react there for 6 minutes. Thereafter, the molded foam was removed and the initial force-to-crush (FTC) and further physical properties were determined.

This force is a measure of the open-cell character of the foam, i.e. the lower the applied force, the more open-cell is the foam immediately after foaming.

Example 1

The stabilizer used was a polysiloxane mixture according to the invention in which the proportion with N<5 was less than 1% by weight, that with N>12 was 21% by weight and that with N>22 was about 2% by weight.

0.1 part of the siloxane was incorporated per 100 parts of polyol. The foam had good stability and showed no defects in the subsurface zones or the skin. The cell count was 9 cells/cm. The initial force-to-crush was: 69.4 kPa.

Example 2

The stabilizer used was a polysiloxane mixture according to the invention in which the proportion with N<5 was less than 1% by weight, that with N>12 was 21% by weight and that with N>22 was about 2% by weight. 0.05 part of the siloxane was incorporated per 100 parts of polyol. The foam had good stability and showed no defects in the subsurface zones or the skin. The cell count was 8 cells/cm. The initial force-to-crush was: 58.7 kPa.

Example 3

The stabilizer used was a polysiloxane mixture according to the invention in which the proportion with N>12 was 8% by weight. 0.05 part of the siloxane was incorporated per 100 parts of polyol. The foam had good stability and showed no defects in the subsurface zones or the skin. The cell count was 10 cells/cm. The initial force-to-crush was: 56.1 kPa.

Example 4

The stabilizer used was a polysiloxane mixture according to the invention in which the proportion with N<5 was less than 1% by weight and that with N from 11 to 14 was 56% by weight.

0.04 part of the siloxane was incorporated per 100 parts of polyol. The foam had good stability and showed no defects in the subsurface zones or the skin. The cell count was 11 cells/cm. The initial force-to-crush was: 54.2 kPa.

Examples in Slabstock Foam, Formulation B:

The foams were prepared in the known manner by mixing all components, except for the isocyanate, in a beaker and then adding the isocyanate and stirring it in for 7 seconds at high stirrer speed. The reaction mixture was then introduced into a paper-lined container having a base area of 28×28 cm. The height of rise and the settling were determined. The blow-off of the foam was rated with values from 0 to 2, 0 being assigned for poor or unrecognizable blow-off and 2 for very good blow-off. After complete curing of the foams, further physical properties were determined.

Example 5

The stabilizer used was a polysiloxane mixture according to the invention in which the proportion with N>12 was 8% by weight. 0.1 part of the siloxane was incorporated per 100 parts of polyol. The foam had good stability: at a height of rise of 31.0 cm, the settling was only 0.2 cm. The blow-off behavior was rated with from 1 to 2. The cell count was from 8 to 9 cells/cm.

Example 6

The stabilizer used was a polysiloxane mixture according to the invention in which the proportion with N<5 was less than 1% by weight and that with N from 11 to 14 was 56% by weight.

0.08 part of the siloxane was incorporated per 100 parts of polyol. The foam had good stability: at a height of rise of 31.2 cm, the settling was only 0.2 cm. The blow-off behavior was rated with from 1 to 2. The cell count was from 9 to 10 cells/cm.

Example 7

The stabilizer used was a polysiloxane mixture according to the invention in which the proportion with N<5 was less than 1% by weight, that with N>12 was 21% by weight and that with N>22 was about 2% by weight.

0.1 part of the siloxane was incorporated per 100 parts of polyol. The foam had good stability: at a height of rise of 30.6 cm, the settling was only 0.2 cm. The blow-off behavior was rated with 1. The cell count was from 7 to 8 cells/cm.

Comparative Example 1

The stabilizer used was a polysiloxane mixture of the following composition: N=5:21.5%, N=6:31.3%, N=7:27.6%, N=8:19.4%, N=9: 0.2%, as described in DE-A-25 33 074.

0.1 part of the siloxane was incorporated per 100 parts of polyol. The foam did not have good stability: at a height of rise of 30.8 cm, the settling was 1.0 cm. The blow-off behavior was rated with from 0 to 1. The cell count was 10 cells/cm.

Comparative Example 2

The stabilizer used was a polysiloxane mixture of the following composition: N=5:0.4%, N=6:2.6%, N=7:25.2%, N=8:46.8%, N=9:23.2%, N=10:1.8%, as described in EP-A-1 095 968.

0.1 part of the siloxane was incorporated per 100 parts of polyol. The foam did not have good stability: at a height of rise of 30.5 cm, the settling was 2.0 cm. The blow-off behavior was rated with 0. The cell count was from 8 to 9 cells/cm.

Examples in Slabstock Foam, Formulation C:

The foams were prepared in the known manner by mixing all components, except for the isocyanate, in a beaker and then adding the isocyanate and stirring it in for 7 seconds at high stirrer speed. The reaction mixture was then introduced into a paper-lined container having a base area of 28×28 cm. The height of rise and the settling were determined. The blow-off of the foam was rated with values from 0 to 2, 0 being assigned for poor or unrecognizable blow-off and 2 for very good blow-off. After complete curing of the foams, further physical properties were determined.

Example 8

The stabilizer used was a polysiloxane mixture according to the invention in which the proportion with N<5 was less than 1% by weight and that with N from 11 to 14 was 56% by weight.

0.016 part of the siloxane was incorporated per 100 parts of polyol. The foam had good stability: at a height of rise of 20.1 cm, the settling was only 0.2 cm. The blow-off behavior was rated with 1. The cell count was 12 cells/cm.

Example 9

The stabilizer used was a polysiloxane mixture according to the invention in which the proportion with N<5 was less than 1% by weight, that with N>12 was 21% by weight and that with N>22 was about 2% by weight.

0.016 part of the siloxane was incorporated per 100 parts of polyol. The foam had good stability: at a height of rise of 20.9 cm, the settling was only 0.4 cm. The blow-off behavior was rated with 1. The cell count was 14 cells/cm.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A process for the preparation of polyurethane cold cure foams by reacting a mixture of polymer polyols optionally containing fillers with polyfunctional isocyanates, amines, crosslinking agents, catalysts, blowing agents and stabilizers, wherein the stabilizers used are siloxane compounds of the general formula (1)

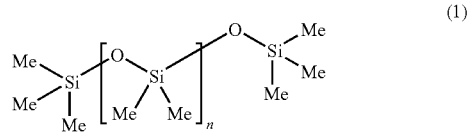

(1)

the proportion of siloxanes with N=(n+2)>9 being higher than 10% by weight and that with N>12 is present in amounts of 5 to 30% by weight, and that with N>22 is present in an amounts of up to 5% by weight; the fractions of linear (N<5) and cyclic siloxanes (D3 to D8) are present in amounts of up to 5% by weight wherein the % by weight is based on the total weight of the siloxanes; and wherein the solid content of the polymer polyols is from 5% to 40% by weight.

2. The process for the preparation of polyurethane cold cure foams as claimed in claim 1, wherein the polyols have an average molecular weight of from about 4800 to 6500 g/mol.

3. The process for the preparation of polyurethane cold cure foams as claimed in claim 1, wherein the polyols have a content of primary hydroxyl groups of at least 70%.

4. The process for the preparation of polyurethane cold cure foams as claimed in claim 1, wherein the polyfunctional isocyanates used are toluylene diisocyanate, diphenylmethane diisocyanate or mixtures thereof 5. The process for the preparation of polyurethane cold cure foams as claimed in claim 2, wherein the polyols have a content of primary hydroxyl groups of at least 70%.

6. The process of claim 5, wherein N>22 is present in amounts of up to 3% by weight; the fractions of linear (N<5) and cyclic siloxanes (D3 to D8) are present in amounts of up to 2% by weight; and the fraction of N>12 is present in amounts of 7 to 25%, wherein the % by weight is based on the total weight of the siloxanes.

7. The process of claim 5, wherein N>12 is present in amounts of 7 to 25% by weight, wherein the % by weight is based on the total weight of the siloxanes.

8. The process of claim 5, wherein N<5 and cyclic siloxanes (D3 to D8) is present in amounts of up to 5% by weight and N=11 to 14 is present in amounts of 55% to 75% by weight, wherein the % by weight is based on the total weight of the siloxanes.

9. The process of claim 5, wherein N<5 and cyclic siloxanes (D3 to D8) is present in amounts of up to 2% by weight and N=11 to 14 is present in amounts of 55% to 60% by weight, wherein the % by weight is based on the total weight of the siloxanes.

10. The process for the preparation of polyurethane cold cure foams as claimed in claim 6, wherein the polyfunctional isocyanates used are toluylene diisocyanate, diphenylmethane diisocyanate or mixtures thereof 11. The process for the preparation of polyurethane cold cure foams as claimed in claim 7, wherein the polyfunctional isocyanates used are toluylene diisocyanate, diphenylmethane diisocyanate or mixtures thereof 12. The process for the preparation of polyurethane cold cure foams as claimed in claim 9, wherein the polyfunctional isocyanates used are toluylene diisocyanate, diphenylmethane diisocyanate or mixtures thereof.

13. A polyurethane cold cure foam produced by the process of claim 1.

14. A polyurethane cold cure foam produced by the process of claim 6.

15. A polyurethane cold cure foam produced by the process of claim 7.

16. A polyurethane cold cure foam produced by the process of claim 9.

* * * * *